(12) United States Patent
Smith et al.

(10) Patent No.: US 10,803,411 B1
(45) Date of Patent: Oct. 13, 2020

(54) ENTERPRISE PLATFORM DEPLOYMENT (71) Applicant: MicroStrategy Incorporated, Vienna, VA (US)

(72) Inventors: Andrew Smith, Oakton, VA (US); Clayton Myers, Oak Hill, VA (US); Thomas Leuchtner, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 469 days.

(21) Appl. No.: 15/489,602

(22) Filed: Apr. 17, 2017

(51) Int. Cl.
 *G06Q 10/00* (2012.01)
 *G06Q 10/06* (2012.01)

(52) U.S. Cl.
 CPC ... *G06Q 10/06312* (2013.01); *G06Q 10/0631* (2013.01); *G06Q 10/06315* (2013.01)

(58) Field of Classification Search
 CPC .. G06Q 10/06; G06Q 10/0631; G06Q 10/063; G06Q 10/06312; G06Q 10/06313; G06Q 10/06315
 See application file for complete search history.

(56) References Cited

U.S. PATENT DOCUMENTS

| | | |
|---|---|---|
| 7,870,550 B1 | 1/2011 | Qureshi et al. |
| 7,935,613 B2 | 5/2011 | Gizewski |
| 8,347,263 B1 | 1/2013 | Offer |
| 8,392,364 B2 | 3/2013 | Horn et al. |
| 8,589,955 B2 | 11/2013 | Roundtree et al. |
| 8,799,115 B2 | 8/2014 | Schmitt |
| 8,997,038 B2 | 3/2015 | Becker |
| 9,043,458 B2 | 5/2015 | Balaji et al. |
| 9,134,964 B2 | 9/2015 | Hirsch |
| 9,170,800 B2 | 10/2015 | Lang |
| 9,361,011 B1 | 6/2016 | Burns |
| 9,426,433 B1 | 8/2016 | Mazzarella |
| 9,461,972 B1 | 10/2016 | Mehta |
| 9,715,370 B2 | 7/2017 | Friedman |
| 9,733,985 B2 | 8/2017 | Lyoob et al. |
| 9,753,618 B1 | 9/2017 | Jain |
| 9,858,063 B2 | 1/2018 | Jain et al. |

(Continued)

OTHER PUBLICATIONS

Zhang, L., Zhang, Y., Jamshidi, P., Xu, L., & Pahl, C. (2014). Workload Patterns for Quality-Driven Dynamic Cloud Service Configuration and Auto-Scaling. 2014 IEEE/ACM 7th International Conference on Utility and Cloud Computing, 156-165. (Year: 2014).*

(Continued)

*Primary Examiner* — William S Brockington, III
(74) *Attorney, Agent, or Firm* — Fish & Richardson P.C.

(57) ABSTRACT

Methods, systems, apparatus, including computer programs encoded on computer storage medium, for deploying an enterprise platform environment. In one aspect, the method may include providing a provisioning console, wherein the provisioning console includes a plurality of configurable enterprise platform configuration settings, receiving a provisioning request to generate a customized enterprise platform based on user-defined settings for each of the plurality of configurable enterprise platform configuration settings, generating an enterprise platform deployment package based on the user-defined settings, and provisioning cloud-based resources to establish an enterprise platform based on the enterprise platform deployment package.

20 Claims, 7 Drawing Sheets

(56) References Cited

U.S. PATENT DOCUMENTS

| | | | |
|---|---|---|---|
| 9,886,267 B2 | 2/2018 | Maheshwari et al. | |
| 2002/0022973 A1 | 2/2002 | Sun | |
| 2003/0236745 A1* | 12/2003 | Hartsell | G06Q 20/102 705/40 |
| 2005/0086587 A1 | 4/2005 | Balz | |
| 2006/0282516 A1 | 12/2006 | Taylor | |
| 2008/0052343 A1 | 2/2008 | Wood | |
| 2008/0126110 A1 | 5/2008 | Haeberle | |
| 2008/0127040 A1 | 5/2008 | Barcellona | |
| 2009/0043689 A1 | 2/2009 | Yang | |
| 2009/0119678 A1 | 5/2009 | Shih | |
| 2009/0156190 A1 | 6/2009 | Fisher | |
| 2010/0211941 A1 | 8/2010 | Roseborough | |
| 2011/0200979 A1 | 8/2011 | Benson | |
| 2012/0131594 A1* | 5/2012 | Morgan | G06F 9/5072 718/105 |
| 2012/0185913 A1* | 7/2012 | Martinez | G06F 9/455 726/1 |
| 2012/0239739 A1 | 9/2012 | Manglik et al. | |
| 2012/0311154 A1* | 12/2012 | Morgan | H04L 67/1002 709/226 |
| 2013/0110565 A1 | 5/2013 | Means | |
| 2013/0283188 A1 | 10/2013 | Sanghvi | |
| 2014/0026113 A1 | 1/2014 | Farooqi | |
| 2014/0033171 A1 | 1/2014 | Lorenz | |
| 2014/0088995 A1 | 3/2014 | Damani | |
| 2014/0100883 A1 | 4/2014 | Hamilton | |
| 2014/0101628 A1 | 4/2014 | Almog | |
| 2014/0109072 A1 | 4/2014 | Zhongmin et al. | |
| 2014/0109115 A1 | 4/2014 | Low | |
| 2014/0109177 A1 | 4/2014 | Barton et al. | |
| 2014/0156823 A1 | 6/2014 | Liu | |
| 2014/0240122 A1 | 8/2014 | Roberts | |
| 2014/0273913 A1 | 9/2014 | Michel | |
| 2014/0278536 A1 | 9/2014 | Zhang | |
| 2014/0324647 A1* | 10/2014 | Iyoob | G06Q 40/12 705/30 |
| 2015/0074635 A1 | 3/2015 | Margiotta | |
| 2015/0089224 A1 | 3/2015 | Beckman | |
| 2015/0135160 A1 | 5/2015 | Gauvin | |
| 2015/0163121 A1 | 6/2015 | Mahaffey | |
| 2015/0294090 A1 | 10/2015 | Kodiyan | |
| 2016/0058287 A1 | 3/2016 | Dyell | |
| 2016/0092339 A1 | 3/2016 | Straub | |
| 2017/0048215 A1 | 2/2017 | Straub | |
| 2018/0018154 A1* | 1/2018 | Burns | G06F 8/61 |
| 2018/0046453 A1* | 2/2018 | Nair | G06F 11/3684 |
| 2018/0048532 A1* | 2/2018 | Poort | H04L 67/10 |
| 2018/0121187 A1 | 5/2018 | Jain et al. | |

OTHER PUBLICATIONS

Airwatch: "AirWatch Enterprise Mobility Management Demo," youtube, Jul. 22, 2014, retrieved from the Internet <https://www.youtube.com/watch?v=ucV1n4-tgk>, retrieved on May 3, 2017, 1 page.

Airwatch: "Airwatch laptop management demo," youtube, Oct. 3, 2014, retrieved from the Internet <https://www.youtube.com/watch?v=3gHfmdVZECM>, retrieved on May 3, 2017, 1 page.

Henze et al., Push the study to the App store: evaluating off-screen visualizations for maps in the android market, Sep. 2010, 2 pages.

Taivan et al., Application Diversity in Open Display Networks, Jun. 2014, 6 pages.

* cited by examiner

ENTERPRISE PLATFORM DEPLOYMENT

FIELD

This specification generally relates to the deployment of an enterprise platform.

BACKGROUND

Deployment of an enterprise platform has typically been a complicated and time-consuming process. For example, deployment of an enterprise platform may typically be facilitated by one or more highly skilled programmers working on the deployment for multiple days or weeks. Complicated and lengthy application deployments lead to lost productivity, as a technical staff of an organization spends extended period of time configuring the enterprise platform instead of using the enterprise platform to develop applications.

SUMMARY

According to one innovative aspects of the present disclosure, a method of deploying an enterprise platform is disclosed. The method may include actions of providing a provisioning console, wherein the provisioning console includes a plurality of configurable enterprise platform configuration settings, receiving a provisioning request to generate a customized enterprise platform based on user-defined settings for each of the plurality of configurable enterprise platform configuration settings, generating an enterprise platform deployment package based on the user-defined settings, and provisioning cloud-based resources required to establish an enterprise platform based on the enterprise platform deployment package.

Other versions include corresponding systems, apparatus, and computer program to perform the actions of methods, encoded on computer storage devices.

These and other versions may optionally include one or more of the following features. For instance, in some implementations, the user-defined settings may be based on a usage pattern of an organization. In such implementations, the method may further include detecting a potential shift in demand for enterprise platform resources based on the usage pattern of the organization, dynamically adjusting one or more configurable enterprise platform configuration settings based on the detected shift in demand for enterprise platform resources from the organization, generating an updated enterprise platform deployment package based on the one or more dynamically adjusted enterprise platform configuration settings, and provisioning cloud-based resources required to establish an updated enterprise platform based on the updated enterprise platform deployment package.

In some implementations, the user-defined settings may be based on a schedule of one or more user-defined events. In such implementations, the method may further include detecting, based on the schedule of one or more user-defined events, that a user-defined event is scheduled to occur within a predetermined period of time, obtaining a set of user-defined settings for one or more configurable enterprise platform configuration settings that are associated with the scheduled user-defined event, generating an updated enterprise platform deployment package based on the one or more configurable enterprise platform configuration settings that are associated with the scheduled user-defined event, and provisioning cloud-based resources required to establish an updated enterprise platform based on the updated enterprise platform deployment package.

In some implementations, the user-defined settings may be based on input from a user that includes a modification to one or more configurable enterprise platform configuration settings associated with a previously deployed enterprise platform. In such implementations, the method may further include receiving the input from the user that includes the modification to one or more configurable enterprise platform configuration settings associated with a previously deployed enterprise platform, generating an updated enterprise platform deployment package based on the modification to the one or more configurable enterprise platform configuration settings associated with a previously deployed enterprise platform received from the user, and provisioning cloud-based resources required to establish an updated enterprise platform environment based on the updated enterprise platform deployment package.

The details of one or more embodiments of the subject matter described in this specification are set forth in the accompanying drawings and the description below. Other features, aspects, and advantages of the subject matter will become apparent from the description, the drawings, and the claims.

The details of these, and other, implementations are set forth in the accompanying drawings and description below. Other features and advantages will be apparent from the description and drawings, and from the claims.

DETAILED DESCRIPTION

In general, this specification describes enterprise computing systems, and a method for deploying an enterprise platform. An enterprise platform is a particular instance of an enterprise computing environment that is provisioned on one or more servers based on a defined enterprise platform deployment package. An enterprise platform deployment package can be generated based on a set of one or more configurable enterprise platform configuration settings. A set of one or more enterprise platform configuration settings may be (i) received by user input, (ii) dynamically detected based on the usage patterns of one or more users, an organization of users, or the like, or (iii) obtained from a storage location in response to the occurrence of a scheduled event.

The enterprise platform may be considered deployed once provisioning of the enterprise platform is complete. A deployed enterprise platform can be used to execute enterprise applications. Enterprise applications generally refer to types of computer software used to fulfill business needs of organizations such as businesses, schools, interest-based user groups, governments, and the like. Often, these applications rely on large databases and serve data to tens, hundreds, or thousands of users in an organization.

In the enterprise analytics space, deployment of an enterprise platform that can be used to execute, develop, or both, enterprise applications has typically been a time consuming endeavor. Customers often invest large resources such as manpower, funds, and time (e.g., days, weeks, or more) to deploy an enterprise platform. Such deployment may require consultation with volumes of documentation. Time spent by an organization deploying an enterprise platform is time that is not spent using or developing enterprise applications. Accordingly, aspects of the present disclose are directed towards reducing the time necessary to deploy an enterprise platform. The time and resources saved through a reduction in enterprise platform deployment time can be redirected towards enterprise application use and development, thus increasing productivity. In some implementations, use of the present disclosure to deploy an enterprise platform can reduce the time necessary to deploy an enterprise platform from days, weeks, or more to an enterprise deployment time period of less than one hour (e.g., 20 minutes, 15 minutes, or even less).

An enterprise platform can be deployed to execute enterprise applications in different types of server environments. A "server environment" refers to a client-server application framework that can be used to exchange application content, data, and/or other information that is necessary to provide business services through enterprise applications. In one example, a server environment can be provided by servers that are owned or managed by the organization that they serve. For example, these may be "on-premises" servers which may be co-housed or co-located within a particular location associated with an organization. In another example, a server environment can include one or more cloud-based servers that are managed and maintained by a third party, for example, at a location separate from offices of the organization. The cloud-based server is generally connected to a network and remotely accessed by one or more computers over a network connection. In yet another example, a server environment can include one or more cloud-based servers that are privately managed by an organization. In some implementations, as described more particularly below, multiple different server environments can be used within a system to exchange data from a set of distributed data sources. Each server environment hosting an enterprise can store application data used to configure and operate enterprise applications on client devices associated within each server environment.

Figure 1A:
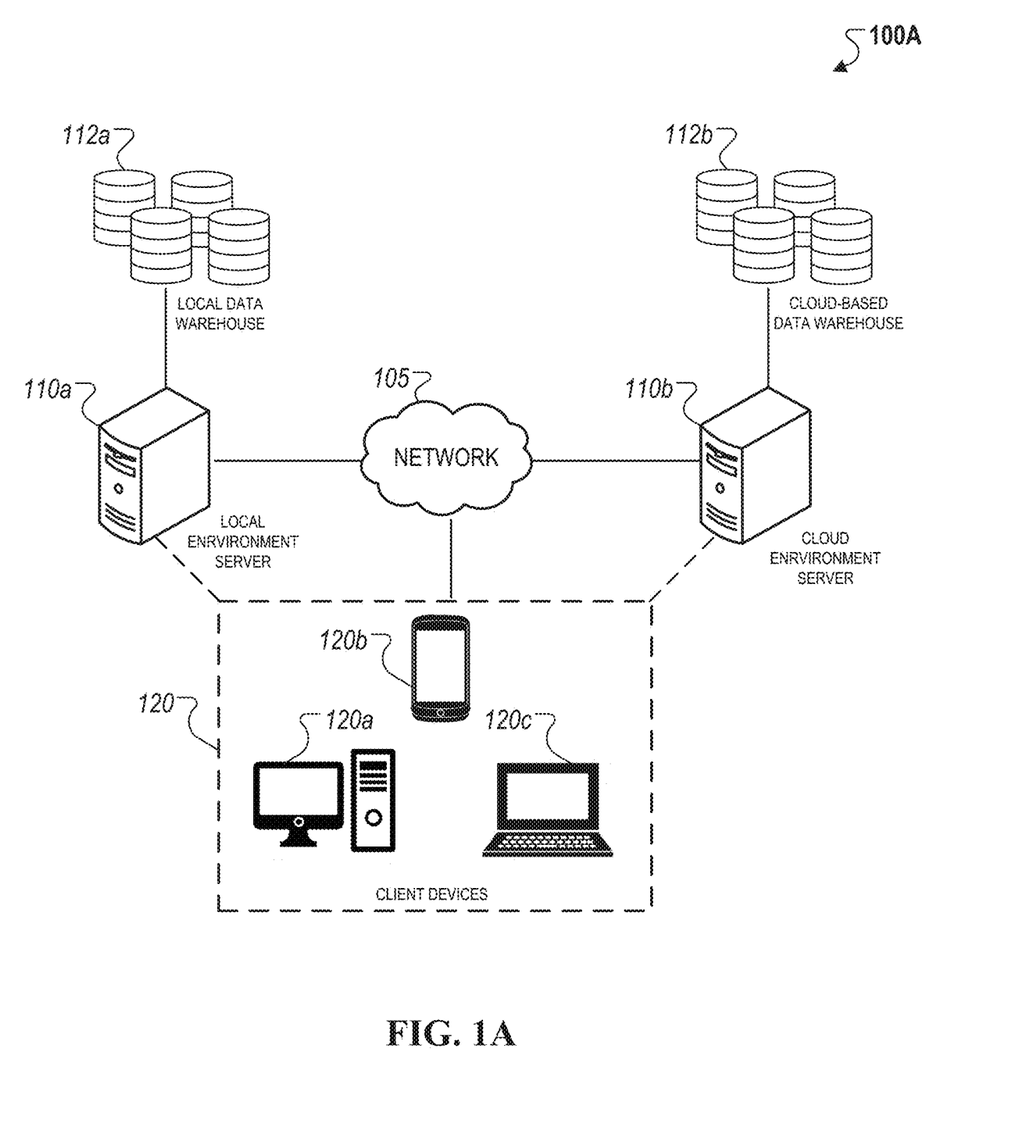
FIG. 1A is a diagram that illustrates an example of an enterprise computing system with different server requirements.

FIG. 1A is a diagram that illustrates an example of an enterprise computing system with different server requirements. In the example, the system 100A includes a local environment server 110a and a cloud environment server 110b, each with respective data warehouses 112a and 112b. The system 100A also includes client devices 120 connected to the servers 110a and 110b over the network 105.

The local environment server 110a can be one or more computing devices that are managed by the organization. These may be located in a particular location associated with an organization (e.g., corporate office, database storage facility, etc.). The local environment server 110a can also be accessed by an on-site system administrator or another authorized user, for example, directly or over a network connection. For example, the local environment server 110a can be co-housed within a particular location such that the authorized users can access data stored on the data warehouse 112a by using a computing terminal that is associated with the local environment server 110a.

The data warehouse 112a may be one or more enterprise data warehouses (EDWs) used for reporting and data analysis of stored information. For instance, the data warehouse 112a can be central repositories of integrated data that are retrieved from multiple data sources. As an example, the data stored within the data warehouse 112a can include current and historical data used for creating business intelligence analytical reports such as annual or quarterly comparisons and trends of sales performance. In other examples, the data stored within the data warehouse 112a can include financial information related to an organization's fiscal year performance (e.g., price-to-earnings, market share penetration, etc.).

The cloud-based environment server 112b can be one or more network-enabled remote computing devices that provide a system administrator with access to data stored on the cloud-based data warehouse 112b over the network 105. In some implementations, the cloud-based environment server 110b may be operated by a third-party provider using the third-party provider's cloud account and can be used by an organization to access data stored on third-party data centers that are remotely located from the local premises of the organization. In other implementations, the cloud-based environment server 110b may be hosted in the cloud in the organization's cloud account and operated by the organization. In each of these examples, users of the organization can use front-end cloud client software associated with the cloud-based environment server 110b to interact with data stored the data warehouse 112b.

The cloud-based data warehouse 112b can be a set of one or more databases that remotely store information, content, and/or other types of data that are utilized to configure, operate, and/or update enterprise applications that operate within the cloud server environment 110b. For instance, like the local data warehouse 112a, the cloud-based data warehouse 112b can store raw data to be aggregated and visualized on interfaces associated with the enterprise applications, or a set of configuration files used to execute the enterprise applications on the client devices 120.

The client devices 120 can be electronic computing devices that exchange data communications with one or more of the local server environment 110a or the cloud-based server environment 110b over the network 105 in order to operate enterprise applications on the client devices 120. For instance, the client devices 120 can include one or more of a laptop computing device, a desktop computing device, a tablet computer, a PDA device, or other electronic devices.

In some implementations, the client devices 120 can be associated with subscription services for enterprise applications configured and operated by the server environments 110a and 110b. In such implementations, the subscription services can be purchased by the end-users of the client devices 120 and data associated with the subscription services (e.g., purchased data reports) can be transmitted to the client devices 120 over the network 105 using enterprise applications as described previously.

Figure 1B:
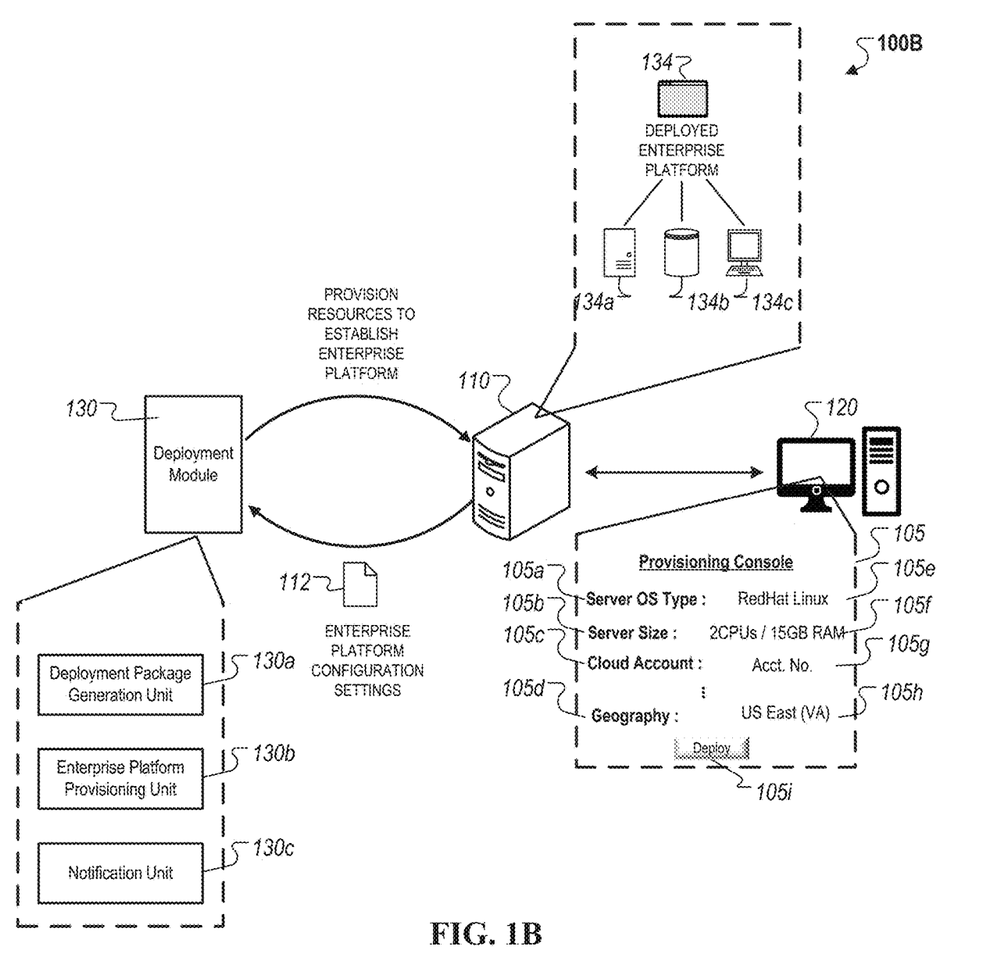
FIG. 1B is a diagram that illustrates an example of a system for deploying an enterprise platform.

FIG. 1B is a diagram that illustrates an example of a system for deploying an enterprise platform. Generally, the server environment 110 includes an environment server 110, a client device 120, and a deployment module 130.

In more detail, the deployment module 130 can be a software component of the enterprise computing system 100A that is used to obtain enterprise platform configuration settings, generate an enterprise platform deployment package, and provision resources for an enterprise platform based on the generated enterprise platform deployment package. In some implementations, the deployment module 130 can be stored on one or more of the environment servers 110a, 110b and operated in parallel with processes required to provide business services using enterprise applications associated with the system 100A to the client device 120. For example, the deployment module 130 can operate in the background and periodically receive requests to deploy a new enterprise platform, receive requests to update an existing enterprise platform, detect a potential shift in an organization's usage patterns, detect the occurrence of a scheduled event, generate enterprise platform deployment packages, provision resources for an enterprise platform based on generated enterprise platform deployment packages, and the like.

Alternatively, the deployment module 130 can be stored on another environment server within the system 100A, other than the environment servers 110a, 110b, that does not execute processes necessary to configure and operate the enterprise applications on a client device 120. In such implementations, the additional environment server can be specifically tasked with obtaining enterprise platform configuration settings, generating an enterprise platform deployment package, and provisioning resources for an enterprise platform based on the generated enterprise platform deployment package without consuming computational resources allocated to the normal operations of one or more enterprise applications hosted, executing, or both, on the environment servers 110a, 110b.

In some implementations, the deployment module 130 may be operated on a virtual machine environment in addition to the environment servers 110a, 110b to mitigate potential performance impacts resulting from an enterprise platform deployment. In such implementations, instead of directly deploying an enterprise platform on either environment servers 110a, 110b, the virtual machine environment can detect that a new (or updated) enterprise platform deployment is necessary, obtain a set of one or more enterprise platform configuration settings, generate an enterprise platform deployment package, and provision necessary resources to establish an enterprise platform based on the generated enterprise deployment package. Then, the system 100A can provide one or more end users of an organization with access to the virtual machine environment to develop one or more applications using the deployed enterprise platform.

With reference to FIG. 1B, an environment server 110 such as a cloud-based environment server may provide a client device 120 with data that can be used to display a provisioning console 105 on the client device 120. The provisioning console 105 is a graphical user interface that includes one or more fields 105e, 105f, 105g, 105h that are configured to receive data indicative of one or more enterprise platform configuration settings. For example, the provisioning console 105 may include a field 105e configured to receive a server OS type 105a (e.g., RedHat Linux, Windows, or the like), a field 105f configured to receive an infrastructure size 105b (e.g., 2 CPUs/15 GB RAM, 4 CPUs/30 GB RAM, or the like), a field 105g configured to receive a cloud account no. 105c (e.g., Cloud Account No. where the enterprise platform can be deployed), a field 105h configured to receive a geography 105h (e.g., US East (VA), US West (CA), or the like), or the like. The fields 105e, 105f, 105g, 105h may include text input fields, radio buttons, checkboxes drop down menus, or the like that can be used for a user to input or select a set of custom enterprise platform configuration settings. Alternatively, or in addition, the user may also select one or more pricing plans that provide varying access to features of an enterprise platform such as a server, a metadata repository, a schema object editor, or the like. In some implementations, the provisioning console may be available via the Internet using one or more application programming interfaces (APIs) provided via a web service such as Amazon's Web Service (AWS) Elastic Beanstalk. The user can instruct the system 100B to deploy an enterprise platform based on the user's set of custom enterprise platform configuration settings by selecting the deploy selectable icon 105i.

The user's set of custom enterprise platform settings 112 may be communicated to the deployment module 130. The deployment module 130 may invoke a deployment package generation unit 130a to coordinate generation of an enterprise platform deployment package. In some implementations, generating an enterprise platform deployment package may include creating a new enterprise platform deployment package based on the set of custom enterprise platform settings 112 received from a user. In such instances, the enterprise platform deployment package generation unit 112 may gather the necessary parameters required to provision an enterprise platform including the necessary infrastructure components, prerequisite applications, and the like. In some implementations, a web service such as AWS Lambda may be used to manage programming operations used to generate the enterprise platform deployment package.

Alternatively, or in addition, the deployment package generation unit 130a may be configured to monitor usage patterns of an organization, usage patterns of individual users of the organization, or the like. In such instances, the deployment package generation unit 130a may dynamically determine a set of custom enterprise platform configuration settings required to generate an enterprise platform that is sufficient to handle the organization's current enterprise application usage. For example, the deployment package generation unit 130a may determine that an organization uses more enterprise resources during a first time period on weekdays from 1:00 pm to 4:00 pm and less enterprise resources during a second time period on weekdays from 2:00 am to 6:00 am. Accordingly, the deployment package generation unit 130a may dynamically adjust one or more custom enterprise platform configuration settings associated with a previously deployed enterprise platform to, e.g., increase processing power and memory resources during the first time period and reduce the amount of processing power and memory resources during the second time period. Alternatively, or in addition, the deployment package generation unit 130a may detect a trend where users of an organization utilize Linux applications in the mornings and Windows applications in the evenings, and generate adjusted custom enterprise platform configuration settings accordingly. In response to a potential shift in usage patterns, the deployment package generation unit 130a may generate an updated enterprise resource deployment package based on the adjusted custom enterprise platform configuration settings.

Alternatively, the deployment package generation unit 130a may be configured to detect the occurrence of schedule events. For example, a user of the client device 120 may schedule an enterprise event at a particular date and time in the future. The user may associate one or more custom enterprise platform configuration settings that are associated with the scheduled event. The deployment package generation unit 130a may determine that a scheduled event is set to occur within a predetermined time period, obtain the one or more custom enterprise settings associated with the scheduled event, and generate an updated enterprise platform deployment package based on the obtained custom enterprise settings.

The enterprise platform deployment package (or updated enterprise deployment package) may be provided to an enterprise platform provisioning unit 130b. The enterprise platform provisioning unit 130b may provision necessary cloud resources to generate an enterprise deployment based on the received enterprise platform deployment package. In some implementations, this may result in the creation of a newly deployed enterprise platform 134. Alternatively, in other implementations such as when the generated enterprise platform deployment package is an updated enterprise platform deployment package, the enterprise platform provisioning unit 130b may modify the resources previously provisioned to a deployed enterprise platform based on the custom enterprise platform configuration settings associated with a received enterprise platform deployment package. In some implementations, a web service such as AWS cloud formation stack may be used to provision cloud-based resources and perform configuration of the enterprise platform.

Provisioning resources by the enterprise platform deployment package may include allocating cloud-based resources to provide an enterprise platform that satisfies the constraints established by a received enterprise platform deployment package. For example, the enterprise platform provisioning unit 130b may allocate an operating system type (e.g., Linux, Windows, or the like) and server size (e.g., CPU power, Memory, or other resources) in a manner that precisely satisfies the specifications established by a received enterprise platform deployment package. Alternatively, or in addition, the enterprise platform provisioning unit 130b may establish a scalable domain name resolution service that allows the deployed enterprise platform 134 to be accessed by one or more client devices 120 at any time and from any location. Alternatively, or in addition, enterprise platform provisioning unit 130b may utilize load balancers to distribute traffic from one or business intelligence applications to between multiple sever instances while providing a public Internet facing endpoint, thus keeping back-end resources secure. Alternatively, or in addition, the enterprise platform provisioning unit 130b may allocate one or more databases a server environment 110 such as a cloud server environment that can be used to host data associated with the deployed enterprise platform 134, a metadata repository, an enterprise platform manager, telemetry-based security monitoring system, or the like.

The notification unit 130c may be configured to generate and transmit one or more types of notifications. For example, the notification unit 130c may be configured to generate and transmit notification that include data that is indicative of the provisioning status of an enterprise platform deployment. Alternatively, or in addition, the notification unit 130c may also generate and transmit a notification upon the completion of the enterprise platform deployment process. For example, the notification unit 130c may transmit a message to a user of the client device 120 that includes (i) data indicating that deployment (or updating) of the enterprise plan deployment is complete, and (ii) data representing a hyperlink that can be used to access the deployed enterprise platform at any time from any device at any location.

The deployed enterprise platform 134 may be provisioned on the server environment 110. In some implementations, the deployed enterprise platform 134 may be running in a virtual machine that is configured based on a received enterprise platform deployment package. The deployed enterprise platform 134 may include a variety of provisioned features that were specified by the enterprise platform deployment package on which the deployed enterprise platform was based.

An enterprise platform deployment package may also specify configuration packages selected by a user of the client device 120. For example, a first deployment configuration may include a server machine 134a. Alternatively, a second deployment configuration may include a server machine 134a and a metadata repository 134b. The metadata repository 134b may include metadata models associated with reusable objects. The metadata model may include, for example, metadata that can be obtained for a reusable object, metadata that can be assigned to a reusable object, metadata such as schema objects, classifications of data that can be assigned to the reusable object, or the like. Alternatively, or in addition, a third deployment configuration may include a server machine 134a, a metadata repository 134b, and a developer application 134c. The developer application 134c can facilitate edits to schema objects such as reusable objects, schema objects, or the like that are stored in the metadata repository 134b.

Figure 2:
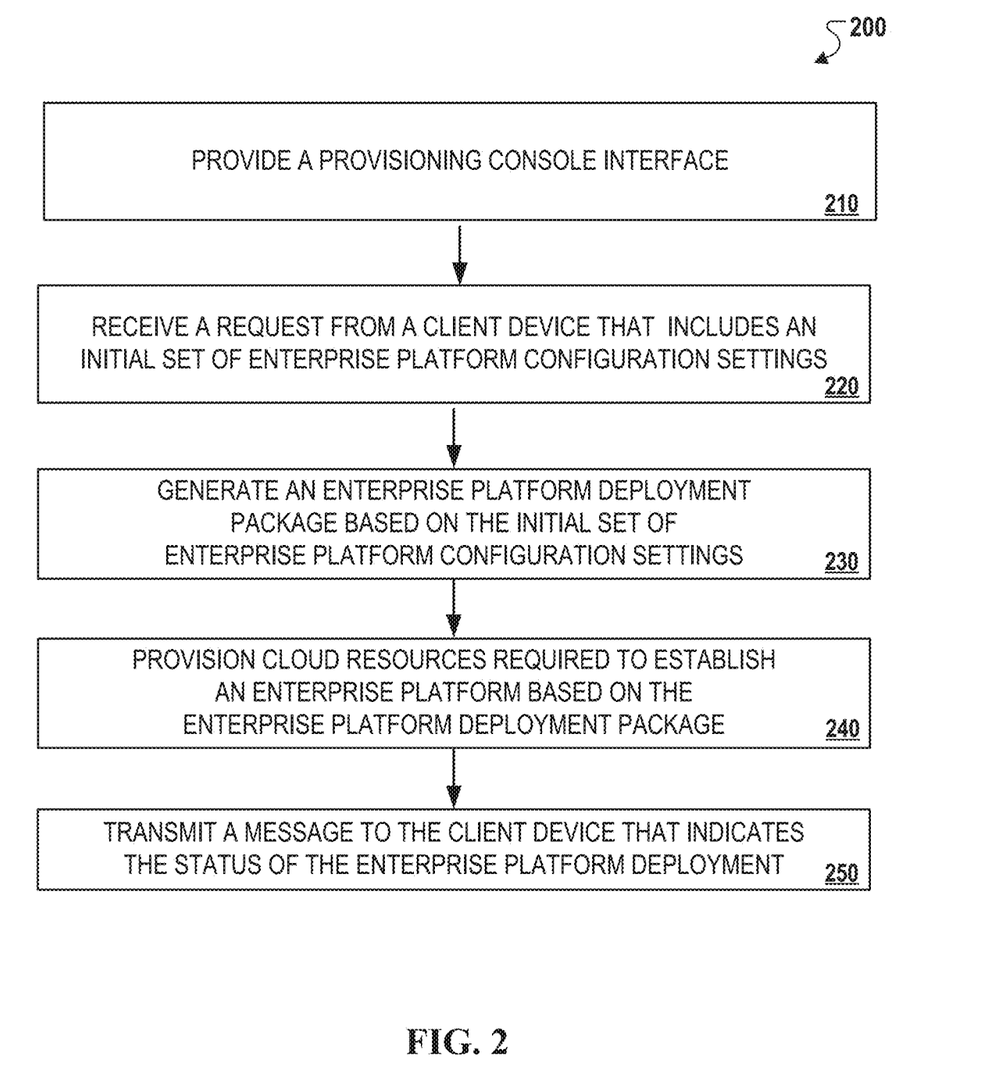
FIG. 2 is a flowchart of an example of a process for deploying an enterprise platform.

FIG. 2 is a flowchart of an example of a process 200 for deploying an enterprise platform. In general, the process 200 includes providing a provisioning console interface 210, receiving a request from a client device that includes an initial set of enterprise platform configuration settings 220, generating an enterprise platform deployment package based on the enterprise platform configuration settings 230, provisioning cloud resources required to establish an enterprise platform based on the enterprise platform deployment package 240, and transmitting a message to the client device that indicates the state of the enterprise platform deployment 250.

For convenience, the process 200 will be further described below as being performed by a system of one or more computers in one or more locations. For example, the system 100B can be appropriately programmed in accordance with this specification to perform the process 200.

In more detail, the system 100B may configured to provide 210 a provisioning console interface. The provisioning console interface may include, for example, a graphical user interface provided for output on the display of a client device that includes one or more fields that are each configured to receive one or more enterprise platform configuration settings. The provisioning console may be made available via a network such as the Internet and be layered on top of one or more APIs provided by a web service such as AWS Elastic Beanstalk.

A user may manipulate the data in one or more fields of the displayed provisioning console in order to input a set of one or more enterprise platform configuration settings. For example, the user may input a server operating system type, a server size, a cloud account number, a geography for the cloud servers that will be used to provision the enterprise platform, or a combination thereof. In some implementations, the user may also select one or more pricing plans that provide varying access to features of an enterprise platform such as a server, a metadata repository, a schema object editor, or a combination thereof. In some implementations, one or more of the fields may be pre-populated with a recommended configuration setting for each of the one or more fields based on an organization's usage trends. The user may submit a command via the provisioning console that generates a request to deploy an enterprise platform based on the one or more enterprise platform configuration settings input by the user.

The system 100B receives 220 the request to deploy an enterprise platform from the client device. The request may include an initial set of enterprise platform configuration settings. The initial set of enterprise platform configuration settings may be selected based on an organization's current level of usage, current level of demand, or the like. In some implementations, the initial set of enterprise platform configuration settings may include, for example, a server operating system type, a server size, a cloud account number, a geography for the cloud servers that will be used to provision the enterprise platform, or a combination thereof.

The system 100B generates 230 an enterprise platform deployment package based on the initial set of enterprise platform configuration settings. In some implementations, generating an enterprise platform deployment package may include creating a new enterprise platform deployment package based on the set of custom enterprise platform settings 112 received from a user. Generating an enterprise platform deployment package may include obtaining a set of parameters required to provision an enterprise platform including the necessary infrastructure components, prerequisite applications, and the like. In some implementations, a web service such as AWS Lambda may be used manage programming operations used to generate the enterprise platform deployment package.

The system 100B provisions 240 cloud resources required to establish an enterprise platform based on the enterprise platform deployment package. Provisioning resources by the enterprise platform deployment package may include allocating cloud-based resources to provide an enterprise platform that satisfies the constraints established by a received enterprise platform deployment package. For example, the system 100B may allocate an operating system type (e.g., Linux, Windows, or the like) and server size (e.g., CPU power, Memory, or other resources) in a manner that precisely satisfies the specifications established by a received enterprise platform deployment package. Alternatively, or in addition, the system 100B may establish a scalable domain name resolution service that allows the deployed enterprise platform to be accessed by one or more client devices at any time and from any location. Alternatively, or in addition, system 100B may utilize load balancers to distribute traffic from one or business intelligence applications to between multiple sever instances while providing a public Internet facing endpoint, thus keeping back-end resources secure. Alternatively, or in addition, the system 100B may allocate one or more databases such as a cloud server environment that can be used to host data associated with the deployed enterprise platform, a metadata repository, an enterprise platform manager, telemetry-based security monitoring system, or the like.

The system 100B may transmit 250 a message to the client device that indicates the status of the enterprise platform deployment. For example, the system 100B may generate and transmit a message indicating that a certain percentage of the enterprise platform deployment has been completed. Alternatively, or in addition, the system 100B may generate and transmit a and transmit a message indicating a particular stage of enterprise deployment has been completed. Alternatively, or in addition, the system 100B may also generate and transmit a notification upon the completion of the enterprise platform deployment process. For example, the system 100B may transmit a message to a client device that includes (i) data indicating that deployment (or updating) of the enterprise plan deployment is complete, and (ii) data representing a hyperlink that can be used to access the deployed enterprise platform at any time from any device at any location.

Figure 3:
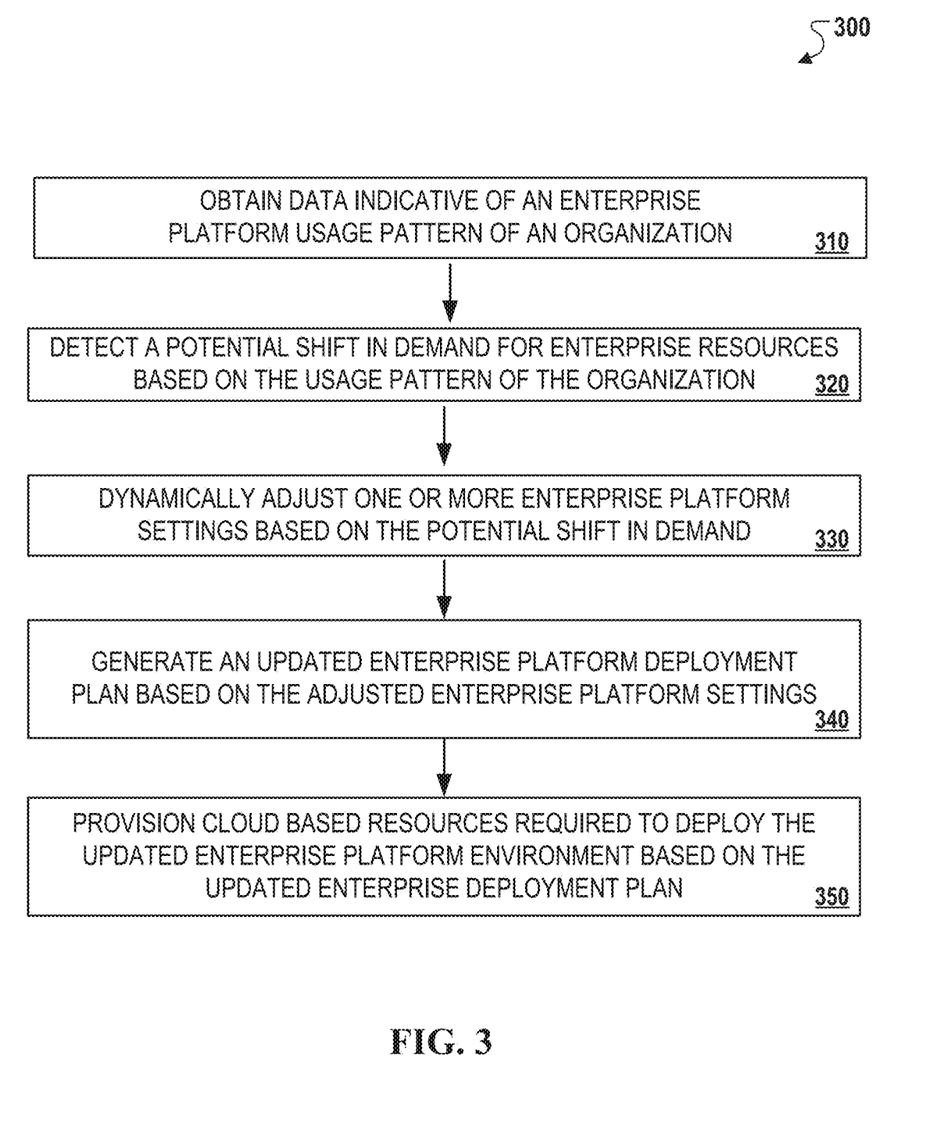
FIG. 3 is a flowchart of an example of a process for updating a deployed enterprise platform.

FIG. 3 is a flowchart of an example of a process 300 for updating a deployed enterprise platform. In general, the process 300 includes obtaining data indicative of an enterprise platform usage pattern of an organization 310, detecting a potential shift in demand for enterprise resources based on the usage pattern of the organization 320, dynamically adjust one or more enterprise platform configuration settings based on the potential shift in demand 330, generating an updated enterprise platform deployment package based on the adjusted enterprise platform settings 340, and provisioning cloud based resources required to the establish an enterprise platform deployment package 350.

For convenience, the process 300 will be further described below as being performed by a system of one or more computers in one or more locations. For example, the system 100B can be appropriately programmed in accordance with this specification to perform the process 300.

In more detail, the system 100B can obtain 310 data indicative of an enterprise platform usage pattern of an organization. For example, the system 100B may determine that the organization uses more enterprise platform resources during a first time period such as weekdays from 1:00 pm to 4:00 pm and less enterprise platform resources during a second time period such as weekdays from 2:00 am to 6:00 am. By way of another example, the system 100B may detect a trend where users of an organization utilize Linux applications in the mornings and Windows applications in the evenings, and generate adjusted custom enterprise platform configuration settings accordingly. Detecting usage patterns may include accessing usage logs associated with an organization's use of a deployed enterprise environment. The system may access, obtain, and analyze the usage logs in an effort to identify one or more enterprise platform usage patterns of an organization.

The system 100B can detect 320 a potential shift in demand for enterprise resources based on one or more usage patterns of the organization. Detecting a potential shift in the demand for enterprise resources may include, for example, determining that a particular time of a particular day falls within a predetermined time threshold of a historical shift in usage patterns. For example, the system 100B may know that the organization has heavy enterprise platform usage from 1:00 pm to 4:00 pm on weekdays. As a result, the system 100B may detect a potential shift in an organization's usage patterns as occurring at approximately 12:45 pm. Similarly, by way of another example, the system 100B may know that less enterprise platform resources are used from 2:00 am to 6:00 am. In such instances, the system 100B may detect a potential shift in organization's usage pattern as occurring at approximately 1:45 am.

The system 100B can dynamically adjust 330 a set of one or more custom enterprise platform configuration settings based on a detected potential shift in demand. Accordingly, the system 100B may dynamically adjust one or more custom enterprise platform configuration settings to, e.g., increase processing power and memory resources during the first time period described above and reduce the amount of processing power and memory resources during the second time period described above. By way of a different example, the system 100B may determine that a different operating system is required to perform a set of upcoming tasks that are detected based on an organization's usage patterns.

The system 100B can generate 340 an updated enterprise platform deployment package based on the adjusted set of enterprise platform settings. In such implementations, generating an enterprise platform deployment package may include creating an updated enterprise platform deployment package for an organization based on the set of adjusted enterprise platform settings detected at stage 330. Generating an updated enterprise platform deployment package may include obtaining a set of parameters required to provision an enterprise platform including the necessary infrastructure components, prerequisite applications, and the like. In some implementations, a web service such as AWS Lambda may be used to manage programming operations used to generate the updated enterprise platform deployment package.

The system 100B can provision 350 cloud resources required to establish an enterprise platform based on the updated enterprise platform deployment package. Provisioning resources based on the enterprise platform deployment package may include allocating cloud-based resources to modify an existing enterprise platform to create an updated enterprise platform based on the constraints established by an updated enterprise platform deployment package. For example, the system 100B may allocate an increased server size (e.g., more CPU power, more Memory, or the like) in a manner that precisely satisfies the specifications established by an updated enterprise platform deployment package in response to the detection of a potential shift in an organization's usage pattern that is indicative of a greater need for enterprise platform resources.

Alternatively, or in addition, the system 100B may update a scalable domain name resolution service that allows the deployed enterprise platform to be accessed by one or more client devices at any time and from any location. Alternatively, or in addition, system 100B may update load balancers to distribute traffic from one or business intelligence applications to between multiple sever instances while providing a public Internet facing endpoint, thus keeping backend resources secure. Alternatively, or in addition, the system 100B may update the allocation one or more databases such as a cloud server environment that can be used to host data associated with the deployed enterprise platform such as a metadata repository, an enterprise platform manager, telemetry-based security monitoring system, or the like. Each of the aforementioned updates may be based on the specific criteria established by the updated enterprise platform deployment plan.

Figure 4:
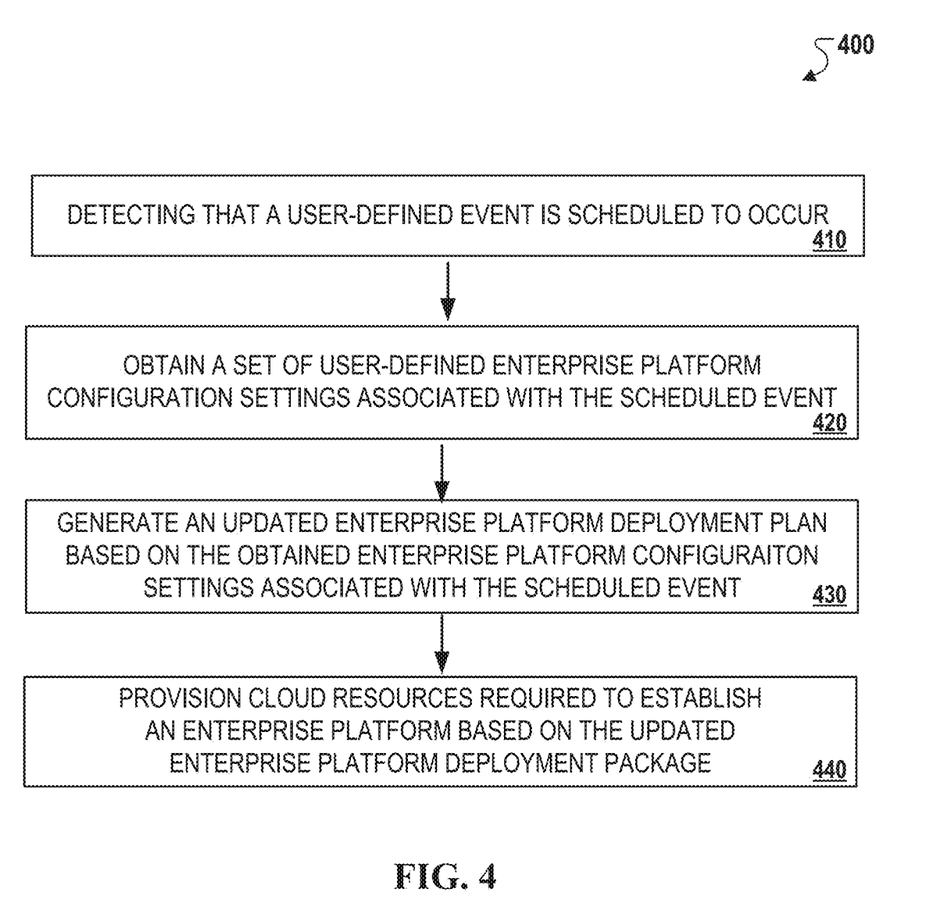
FIG. 4 is a flowchart of another example of a process for updating a deployed enterprise platform.

FIG. 4 is a flowchart of another example of a process 400 for updating a deployed enterprise platform. In general, the process 400 includes detecting that a user-defined event is scheduled to occur 410, obtaining a set of user-defined enterprise platform configuration settings associated with the scheduled event 420, generating an updated enterprise platform deployment plan based on the obtained enterprise platform configuration settings associated with the scheduled event 430, and provisioning cloud based resources required to establish an updated enterprise platform that is based on the updated enterprise platform deployment package 440.

For convenience, the process 400 will be further described below as being performed by a system of one or more computers in one or more locations. For example, the system 100B can be appropriately programmed in accordance with this specification to perform the process 400.

In more detail, the system 100B can detect 410 that a user-defined event is scheduled to occur. For example, in some implementations, a user of the client device 120 may schedule an enterprise event at a particular date and time in the future using a scheduling application. A scheduled event may be associated with (i) a particular time and date, and (ii) one or more enterprise platform configuration settings. The system 100B may access data associated with the scheduled event, and determine, based on the data associated with the scheduled event, that an scheduled event is to occur within a predetermined period of time.

The system 100B can obtain 420 a set of enterprise platform configuration settings associated with the scheduled event. The enterprise platform configuration settings associated with the scheduled event may be defined by a user of client device. Alternatively, the enterprise platform settings associated with the scheduled event may be dynamically determined by the system 100B based on metadata associated with the scheduled event that described the type of event.

The system 100B can generate 430 an enterprise platform deployment package based on the enterprise platform configuration settings associated with the scheduled event. In such implementations, generating an updated enterprise platform deployment package may include creating an updated enterprise platform deployment package for an organization based on the enterprise platform configuration settings obtained at stage 420. Generating an updated enterprise platform deployment package may include obtaining a set of parameters required to provision an enterprise platform including the necessary infrastructure components, prerequisite applications, and the like. In some implementations, a web service such as AWS Lambda may be used to manage programming operations used to generate the updated enterprise platform deployment package.

The system 100B can provision 440 cloud resources required to establish an enterprise platform based on the updated enterprise platform deployment package. Provisioning resources by the enterprise platform deployment package may include allocating cloud-based resources to modify an existing enterprise platform to create an updated enterprise platform based on the constraints established by an updated enterprise platform deployment package. For example, the system 100B may allocate an increased server size (e.g., more CPU power, more Memory, or the like) in a manner that precisely satisfies the specifications established by a updated enterprise platform deployment package in response to one or more enterprise platform configuration settings that are associated with a scheduled event.

Alternatively, or in addition, the system 100B may update a scalable domain name resolution service that allows the deployed enterprise platform to be accessed by one or more client devices at any time and from any location. Alternatively, or in addition, system 100B may update load balancers to distribute traffic from one or business intelligence applications to between multiple sever instances while providing a public Internet facing endpoint, thus keeping backend resources secure. Alternatively, or in addition, the system 100B may update the allocation of one or more databases such as a cloud server environment that can be used to host data associated with the deployed enterprise platform such as a metadata repository, an enterprise platform manager, telemetry-based security monitoring system, or the like. Each of the aforementioned updates may be based on the specific criteria established by the updated enterprise platform deployment plan.

Figure 5:
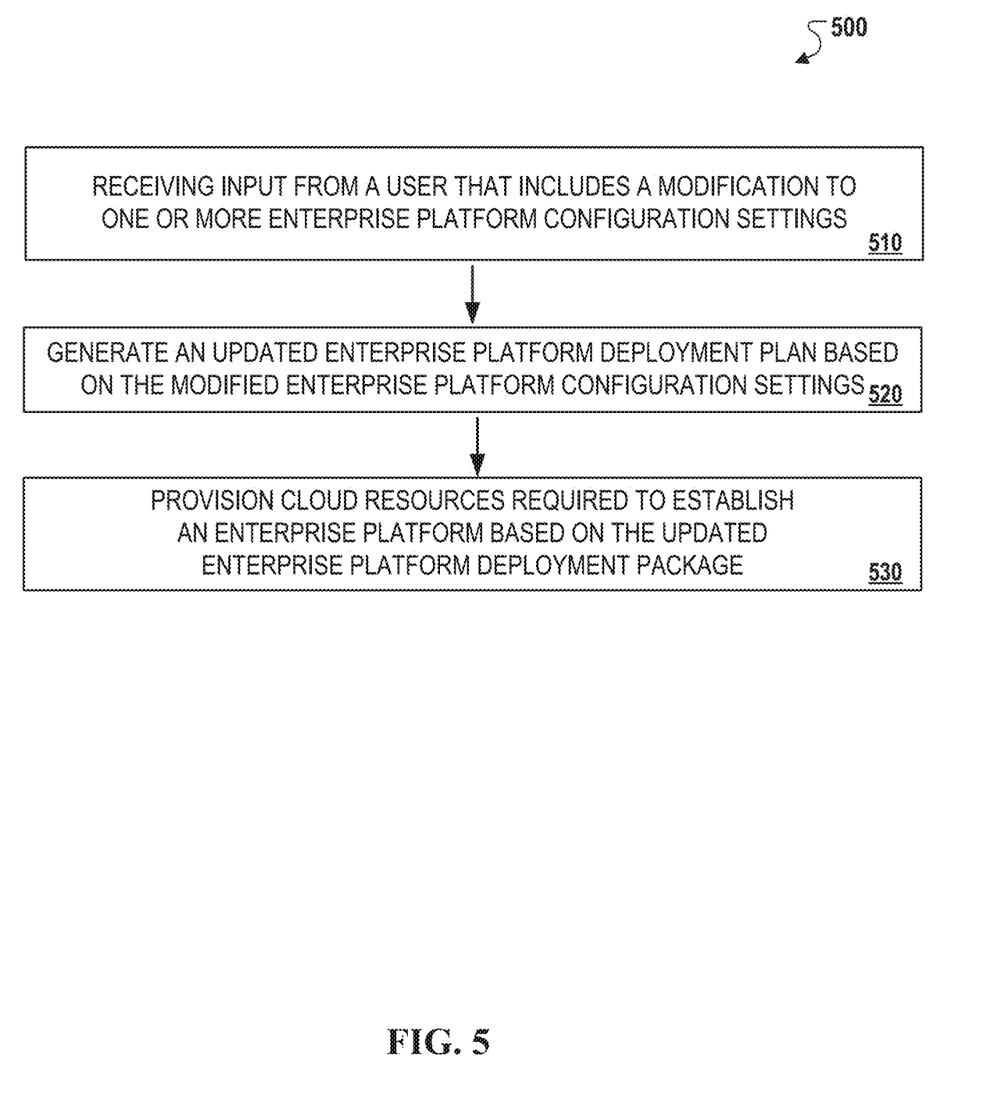
FIG. 5 is a flowchart of another example of a process for updating a deployed enterprise platform.

FIG. 5 is a flowchart of another example of a process 500 for updating a deployed enterprise platform. In general, the process 500 may include receiving input from a user that includes a modification to one or more enterprise platform configuration settings 510, generating an updated enterprise platform deployment plan based on the modified enterprise platform configuration settings 520, and provisioning cloud-based resources required to establish an enterprise platform based on the updated enterprise platform deployment package 530.

For convenience, the process 500 will be further described below as being performed by a system of one or more computers in one or more locations. For example, the system 100B can be appropriately programmed in accordance with this specification to perform the process 500.

In more detail, the system 100B can receive 510 input from a user that includes a modification to one or more enterprise platform configuration settings 510. In some implementations, the modified enterprise platform configuration settings received at staged 510 may be received via a provisioning console. The modified enterprise platform configuration settings may modify one or more enterprise platform configuration settings of an enterprise platform that was previously deployed and being used by an organization to host and execute enterprise applications.

The system 100B can generate 520 an updated enterprise platform deployment plan based on the modified enterprise platform configuration settings. In such implementations, generating an enterprise platform deployment package may include creating an updated enterprise platform deployment package for an organization based on the set of modified enterprise platform configuration settings received at stage 510. Generating an enterprise platform deployment package may include obtaining a set of parameters required to provision an enterprise platform including the necessary infrastructure components, prerequisite applications, and the like. In some implementations, a web service such as AWS Lambda may be used to manage programming operations used to generate the enterprise platform deployment package.

The system 100B can provision 530 cloud resources required to establish an enterprise platform based on the updated enterprise platform deployment package. Provisioning resources by the enterprise platform deployment package may include allocating cloud-based resources to modify an existing enterprise platform to create an updated enterprise platform based on the constraints established by an updated enterprise platform deployment package. For example, the system 100B may allocate an increased server size (e.g., more CPU power, more Memory, or the like) in a manner that precisely satisfies the specifications established by a updated enterprise platform deployment package in response to a request to modify the configuration of a previously deployed enterprise platform.

Alternatively, or in addition, the system 100B may update a scalable domain name resolution service that allows the deployed enterprise platform to be accessed by one or more client devices at any time and from any location. Alternatively, or in addition, system 100B may update load balancers to distribute traffic from one or business intelligence applications to between multiple sever instances while providing a public Internet facing endpoint, thus keeping backend resources secure. Alternatively, or in addition, the system 100B may update the allocation of one or more databases such as a cloud server environment that can be used to host data associated with the deployed enterprise platform such as a metadata repository, an enterprise platform manager, telemetry-based security monitoring system, or the like. Each of the aforementioned updates may be based on the specific criteria established by the updated enterprise platform deployment plan.

Figure 6:
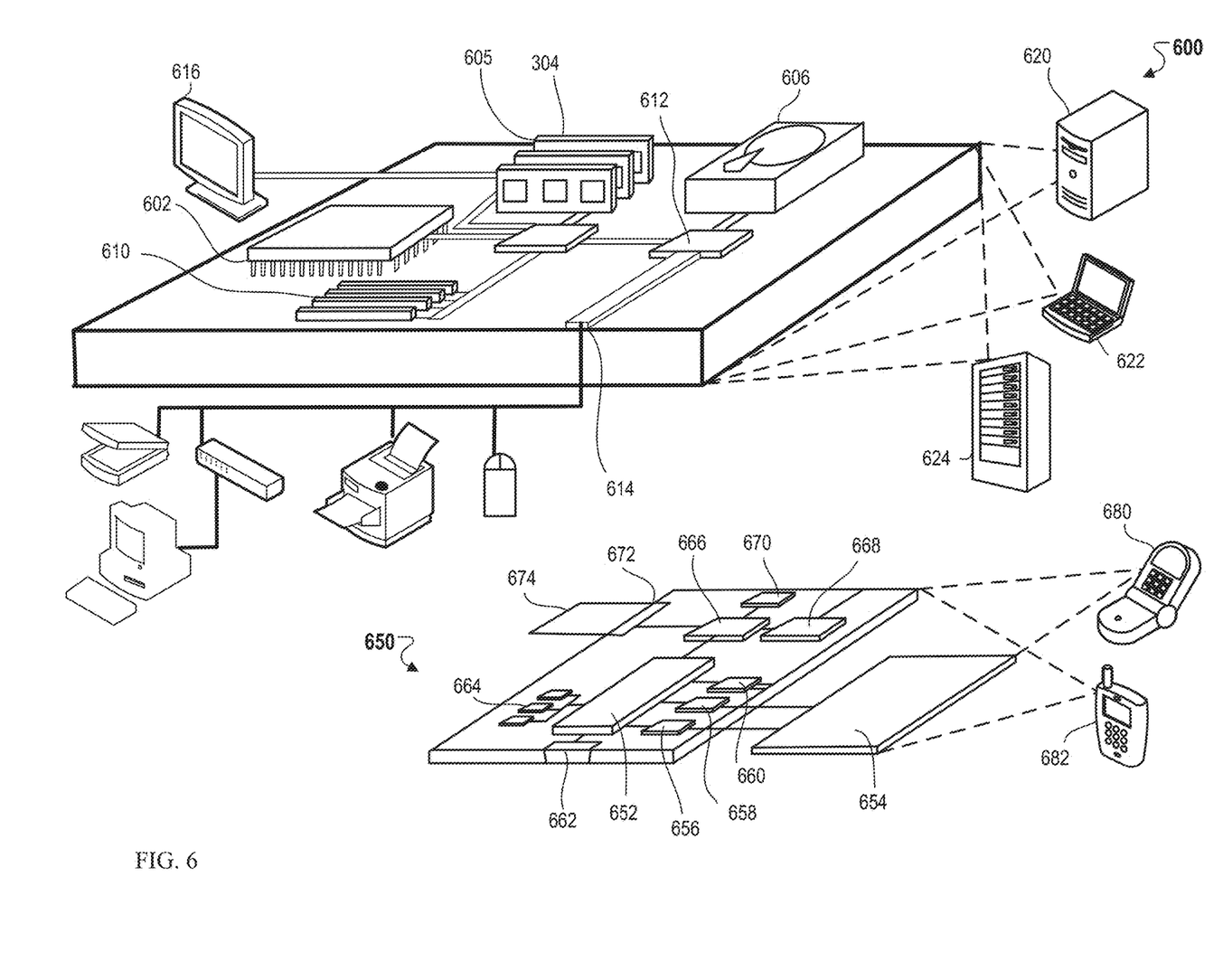
FIG. 6 is a block diagram of computing devices on which the processes described herein, or portions thereof, can be implemented.

FIG. 6 is a block diagram of computing devices 600, 650 on which the processes described herein, or portions thereof, can be implemented.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 608, a high-speed interface 608 connecting to memory 604 and high-speed expansion ports 610, and a low speed interface 612 connecting to low speed bus 614 and storage device 608. Each of the components 602, 604, 608, 608, 610, and 612, are interconnected using various busses, and can be mounted on a common motherboard or in other manners as appropriate. The processor 602 can process instructions for execution within the computing device 600, including instructions stored in the memory 604 or on the storage device 608 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 608 is capable of providing mass storage for the computing device 600. In one implementation, the storage device 608 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 604, the storage device 608, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which can accept various expansion cards (not shown). In the implementation, low-speed controller 612 is coupled to storage device 608 and low-speed expansion port 614. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes a processor 652, memory 664, and an input/output device such as a display 654, a communication interface 666, and a transceiver 668, among other components. The device 650 can also be provided with a storage device, such as a micro-drive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. Additionally, the processor can be implemented using any of a number of architectures. For example, the processor 610 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 674 can also be provided and connected to device 650 through expansion interface 672, which can include, for example, a SIMM (Single In Line Memory Module) card interface. Such expansion memory 674 can provide extra storage space for device 650, or can also store applications or other information for device 650. Specifically, expansion memory 674 can include instructions to carry out or supplement the processes described above, and can include secure information also. Thus, for example, expansion memory 674 can be provide as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound, e.g., voice messages, music files, etc. and can also include sound generated by applications operating on device 650.

The computing device 650 can be implemented in a number of different forms, as shown in the figure. For example, it can be implemented as a cellular telephone 680. It can also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, comprising:
   providing, by the one or more computers, a provisioning interface, wherein the provisioning interface includes a plurality of configurable enterprise platform configuration settings;
   determining, by the one or more computers, a usage pattern indicating one or more trends that include variation in use of enterprise platform resources over time;
   receiving, by the one or more computers, a provisioning request to generate an enterprise platform based on user-defined settings for one or more of the plurality of configurable enterprise platform configuration settings;
   generating, by the one or more computers, an enterprise platform deployment package based on (i) the user-defined settings and (ii) the usage pattern, wherein the enterprise platform deployment package includes different sets of configuration settings for different periods of time, the different sets of configuration settings being configured to cause variation in an allocation of enterprise platform resources over time based on the one or more trends indicated by the usage pattern; and
   provisioning, by the one or more computers, cloud-based resources to establish the enterprise platform based on the enterprise platform deployment package, wherein the enterprise platform is configured based on the different sets of configuration settings in the enterprise platform deployment package to:
      vary an allocation of cloud-based resources over time according to the different sets of configuration settings in the enterprise platform deployment package; and
      use the different sets of configuration settings for different time periods based on the usage pattern indicating the one or more trends, wherein the different sets of configuration settings specify allocations of different levels of processing resources and/or memory resources for the different time periods.

2. The method of claim 1, wherein the user-defined settings are based on a schedule of one or more user-defined events.

3. The method of claim 2, further comprising:
   detecting, based on the schedule of one or more user-defined events, that a scheduled user-defined event is scheduled to occur within a predetermined period of time;
   obtaining a set of user-defined settings for one or more configurable enterprise platform configuration settings that are associated with the scheduled user-defined event;
   generating an updated enterprise platform deployment package based on the one or more configurable enterprise platform configuration settings that are associated with the scheduled user-defined event; and
   provisioning the cloud-based resources or other cloud-based resources to establish an updated enterprise platform based on the updated enterprise platform deployment package.

4. The method of claim 1, wherein the user-defined settings are based on input from a user that includes a modification to one or more configurable enterprise platform configuration settings associated with a previously deployed enterprise platform.

5. The method of claim 4, further comprising:
receiving the input from the user that includes the modification to the one or more configurable enterprise platform configuration settings associated with the previously deployed enterprise platform;
generating an updated enterprise platform environment based on the modification to the one or more configurable enterprise platform configuration settings associated with the previously deployed enterprise platform; and
provisioning the cloud-based resources or other cloud-based resources to establish the updated enterprise platform environment.

6. The method of claim 1, comprising:
detecting, by the one or more computers, a shift in demand for the enterprise platform resources based on the usage pattern; and
in response to detecting the shift in demand, adjusting, by the one or more computers, one or more of the plurality of configurable enterprise platform configuration settings based on the detected shift in demand for the enterprise platform resources,
wherein the enterprise platform deployment package is generated based on the adjusted one or more of the plurality of configurable enterprise platform configuration settings.

7. The method of claim 1, comprising pre-populating one or more user interface fields with a recommended configuration setting that are determined by the one or more computers based on the usage pattern indicating the one or more trends.

8. The method of claim 1, wherein provisioning the cloud-based resources comprises allocating one or more databases of a cloud server environment to host data corresponding to the enterprise platform.

9. The method of claim 1, wherein:
the different sets of configuration settings include a geography; and
provisioning the cloud-based resources to establish the enterprise platform based on the enterprise platform deployment package comprises provisioning the cloud-based resources using servers located in the geography.

10. The method of claim 1, comprising determining software and hardware infrastructure needed to establish the enterprise platform,
wherein provisioning the cloud-based resources to establish the enterprise platform comprises provisioning the cloud-based resources in accordance with the software and hardware infrastructure needed to establish the enterprise platform.

11. A system comprising:
one or more computers and one or more storage devices storing instructions that are operable, when executed by the one or more computers, to cause the one or more computers to perform operations comprising:
providing a provisioning interface, wherein the provisioning interface includes a plurality of configurable enterprise platform configuration settings;
determining a usage pattern indicating one or more trends that include variation in use of enterprise platform resources over time;
receiving a provisioning request to generate an enterprise platform based on user-defined settings for one or more of the plurality of configurable enterprise platform configuration settings;
generating an enterprise platform deployment package based on (i) the user-defined settings and (ii) the usage pattern, wherein the enterprise platform deployment package includes different sets of configuration settings for different periods of time, the different sets of configuration settings being configured to cause variation in an allocation of enterprise platform resources over time based on the one or more trends indicated by the usage pattern; and
provisioning cloud-based resources to establish the enterprise platform based on the enterprise platform deployment package, wherein the enterprise platform is configured based on the different sets of configuration settings in the enterprise platform deployment package to:
vary an allocation of cloud-based resources over time according to the different sets of configuration settings in the enterprise platform deployment package; and
use the different sets of configuration settings for different time periods based on the usage pattern indicating the one or more trends, wherein the different sets of configuration settings specify allocations of different levels of processing resources and/or memory resources for the different time periods.

12. The system of claim 11, wherein the user-defined settings are based on a schedule of one or more user-defined events.

13. The system of claim 12, the operations further comprising:
detecting, based on the schedule of one or more user-defined events, that a scheduled user-defined event is scheduled to occur within a predetermined period of time;
obtaining a set of user-defined settings for one or more configurable enterprise platform configuration settings that are associated with the scheduled user-defined event;
generating an updated enterprise platform deployment package based on the one or more configurable enterprise platform configuration settings that are associated with the scheduled user-defined event; and
provisioning the cloud-based resources or other cloud-based resources to establish an updated enterprise platform based on the updated enterprise platform deployment package.

14. The system of claim 11, comprising determining, based on the user-defined settings, software and hardware infrastructure needed to establish the enterprise platform,
wherein the user-defined settings are based on input from a user that includes a modification to one or more configurable enterprise platform configuration settings associated with a previously deployed enterprise platform.

15. The system of claim 14, the operations further comprising:
receiving the input from the user that includes the modification to the one or more configurable enterprise platform configuration settings associated with the previously deployed enterprise platform;
generating an updated enterprise platform deployment package based on the modification to the one or more configurable enterprise platform configuration settings associated with the previously deployed enterprise platform; and
provisioning the cloud-based resources or other cloud-based resources to establish the updated enterprise platform based on the updated enterprise platform deployment package.

16. One or more non-transitory computer-readable media storing software comprising instructions executable by one or more computers which, upon such execution, cause the one or more computers to perform operations comprising:
- providing a provisioning interface, wherein the provisioning interface includes a plurality of configurable enterprise platform configuration settings;
- determining a usage pattern indicating one or more trends that include variation in use of enterprise platform resources over time;
- receiving a provisioning request to generate an enterprise platform based on user-defined settings for each of the plurality of configurable enterprise platform configuration settings;
- generating an enterprise platform deployment package based on (i) the user-defined settings and (ii) the usage pattern, wherein the enterprise platform deployment package includes different sets of configuration settings for different periods of time, the different sets of configuration settings being configured to cause variation in an allocation of enterprise platform resources over time based on the one or more trends indicated by the usage pattern; and
- provisioning cloud-based resources to establish the enterprise platform based on the enterprise platform deployment package, wherein the enterprise platform is configured based on the different sets of configuration settings in the enterprise platform deployment package to:
  - vary an allocation of cloud-based resources over time according to the different sets of configuration settings in the enterprise platform deployment package; and
  - use the different sets of configuration settings for different time periods based on the usage pattern indicating the one or more trends, wherein the different sets of configuration settings specify allocations of different levels of processing resources and/or memory resources for the different time periods.

17. The one or more non-transitory computer-readable media of claim 16, wherein the user-defined settings are based on a schedule of one or more user-defined events.

18. The one or more non-transitory computer-readable media of claim 17, the operations further comprising:
- detecting, based on the schedule of one or more user-defined events, that a scheduled user-defined event is scheduled to occur within a predetermined period of time;
- obtaining a set of user-defined settings for one or more configurable enterprise platform configuration settings that are associated with the scheduled user-defined event;
- generating an updated enterprise platform deployment package based on the one or more configurable enterprise platform configuration settings that are associated with the scheduled user-defined event; and
- provisioning the cloud-based resources or other cloud-based resources to establish an updated enterprise platform based on the updated enterprise platform deployment package.

19. The one or more non-transitory computer-readable media of claim 18, wherein the user-defined settings are based on input from a user that includes a modification to one or more configurable enterprise platform configuration settings associated with a previously deployed enterprise platform.

20. The one or more non-transitory computer-readable media of claim 19, the operations further comprising:
- receiving the input from the user that includes the modification to the one or more configurable enterprise platform configuration settings associated with the previously deployed enterprise platform;
- generating an updated enterprise platform deployment package based on the modification to the one or more configurable enterprise platform configuration settings associated with the previously deployed enterprise platform; and
- provisioning the cloud-based resources or other cloud-based resources to establish the updated enterprise platform based on the updated enterprise platform deployment package.

\* \* \* \* \*